Dec. 6, 1955  B. HOWARD  2,725,577
HEALTH CABINET
Filed Oct. 12, 1951  5 Sheets-Sheet 1
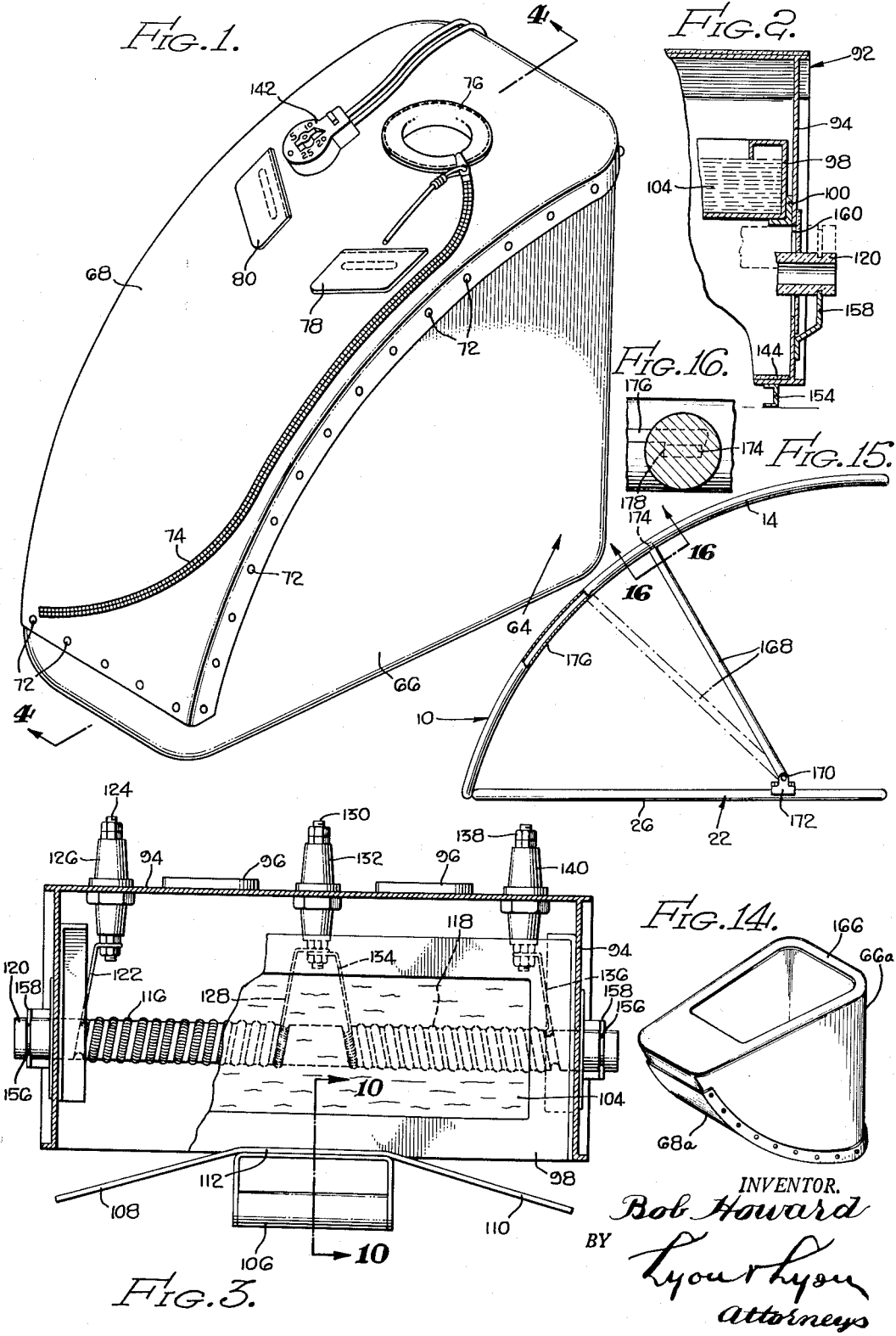
INVENTOR.
Bob Howard
BY
Lyon & Lyon
Attorneys Dec. 6, 1955  B. HOWARD  2,725,577
HEALTH CABINET
Filed Oct. 12, 1951  5 Sheets-Sheet 2
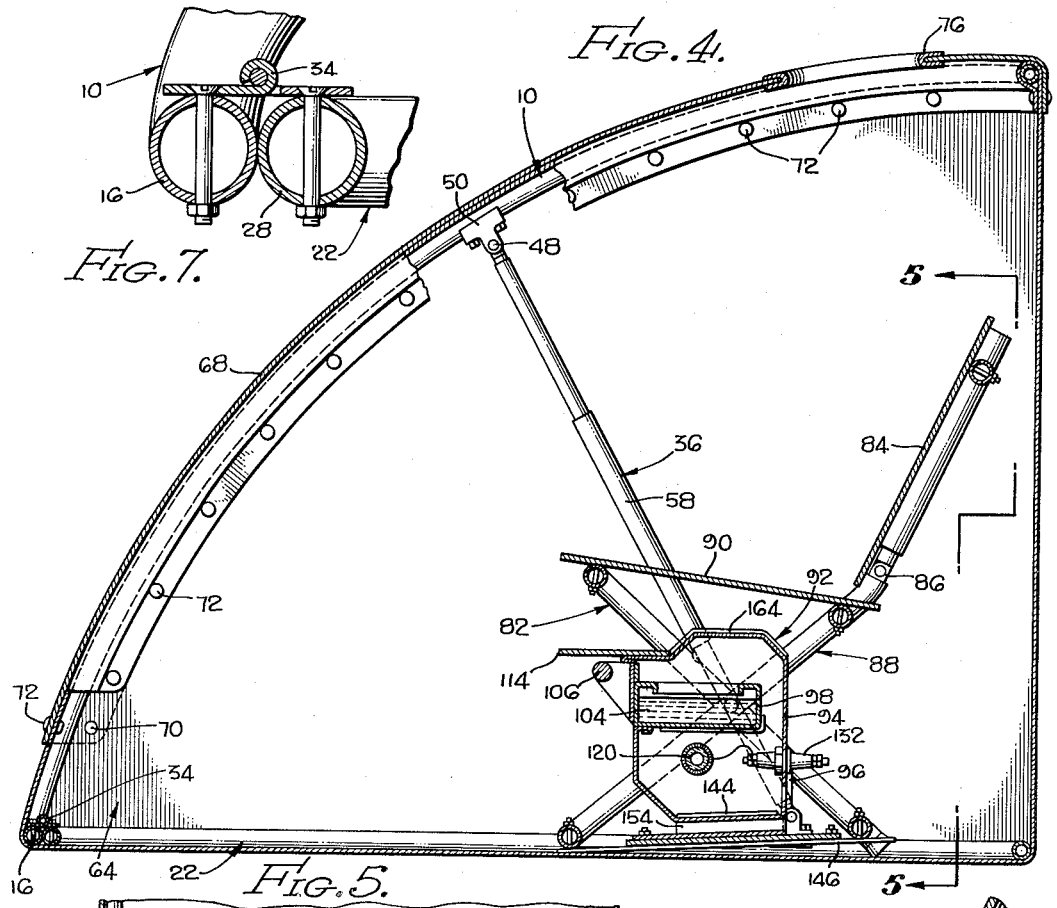
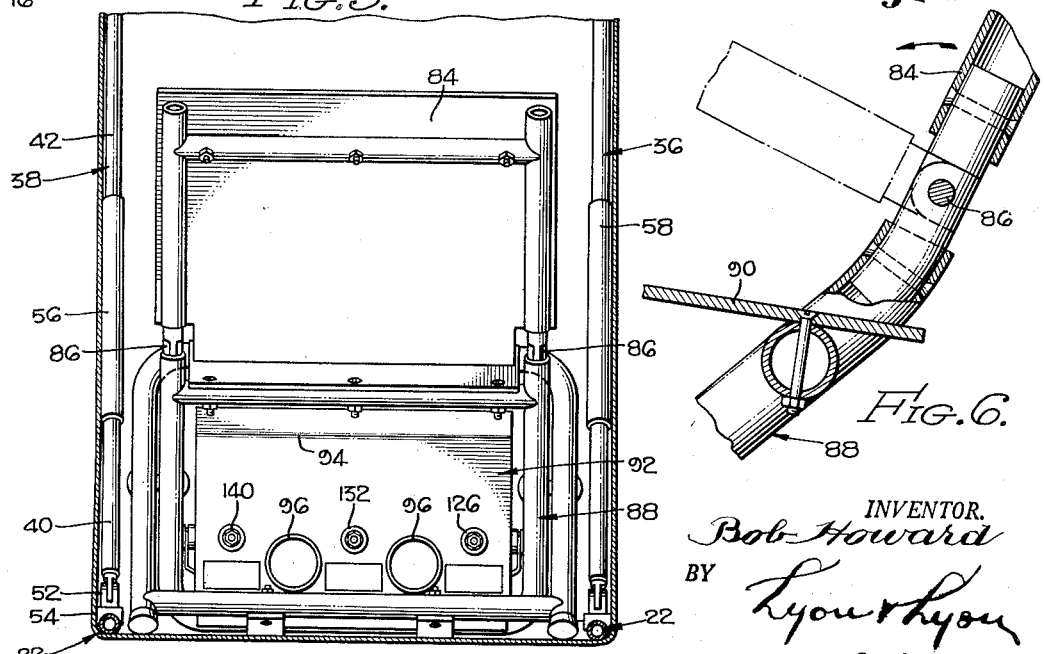
INVENTOR.
Bob Howard
BY
Lyon & Lyon
Attorneys Dec. 6, 1955   B. HOWARD   2,725,577
HEALTH CABINET
Filed Oct. 12, 1951   5 Sheets-Sheet 3
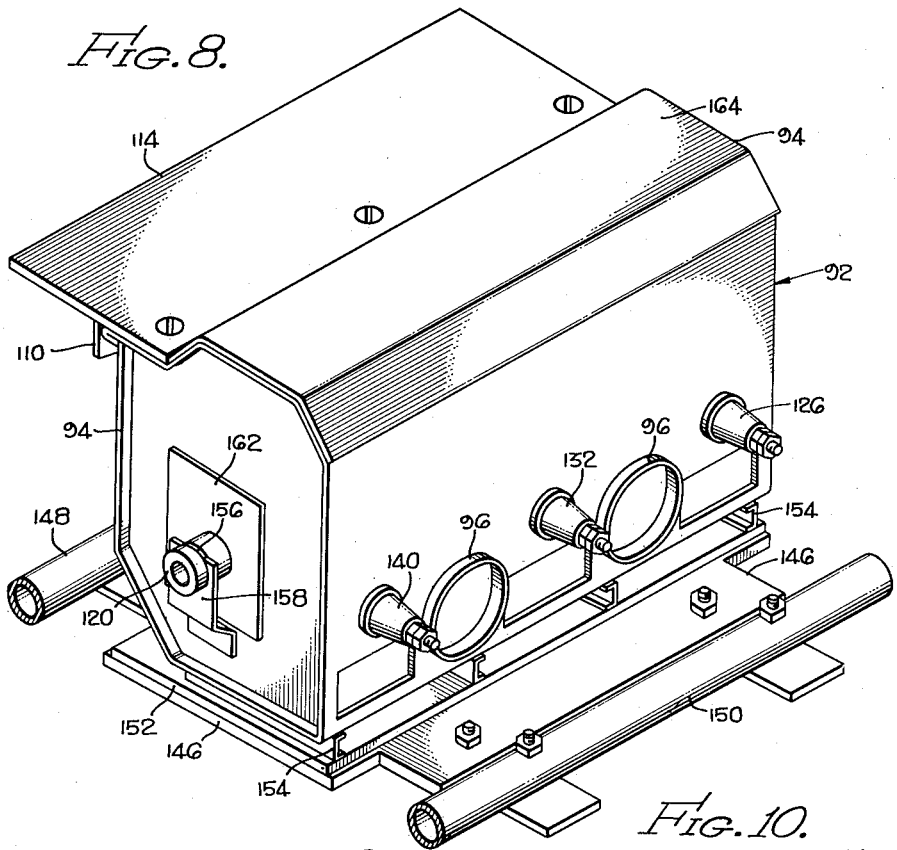
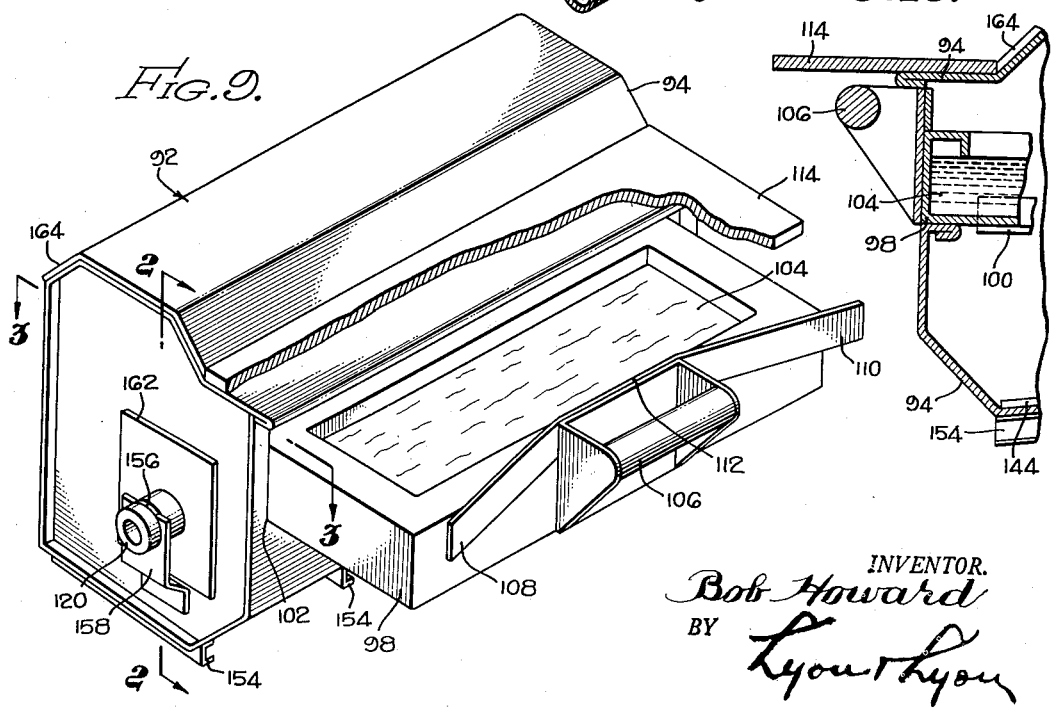
INVENTOR.
Bob Howard
BY
Lyon & Lyon
Attorneys Dec. 6, 1955   B. HOWARD   2,725,577
HEALTH CABINET
Filed Oct. 12, 1951   5 Sheets-Sheet 4
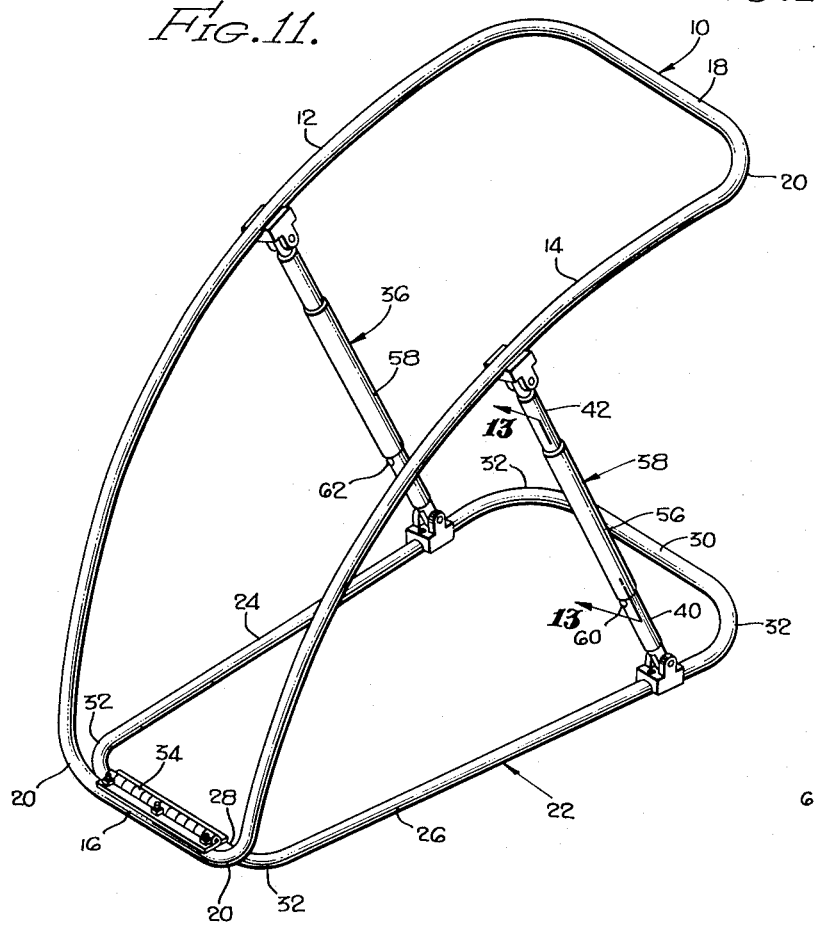
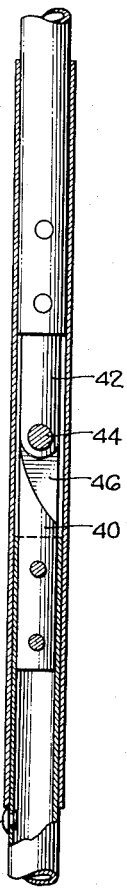
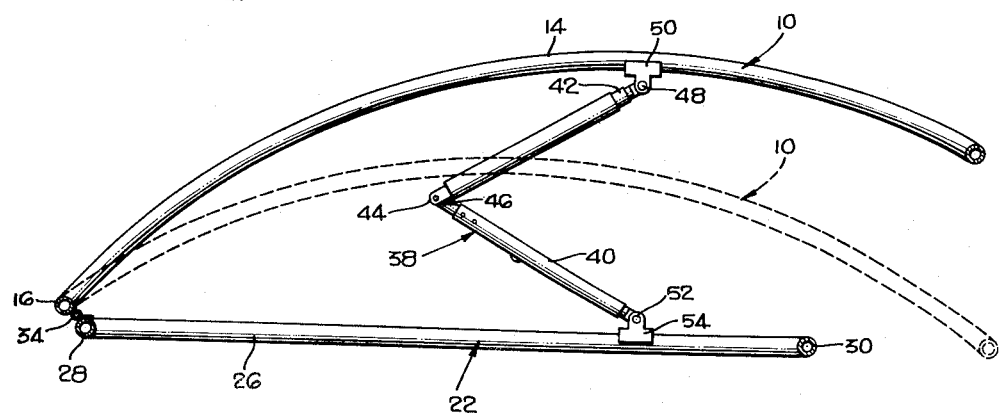
INVENTOR.
Bob Howard
BY Lyon & Lyon
attorneys Dec. 6, 1955    B. HOWARD    2,725,577
HEALTH CABINET
Filed Oct. 12, 1951    5 Sheets-Sheet 5
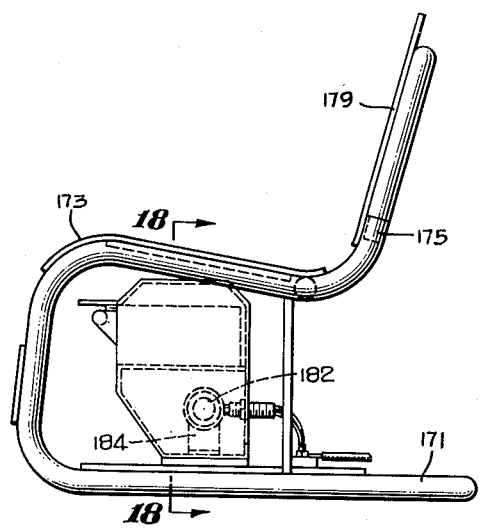
FIG. 17.
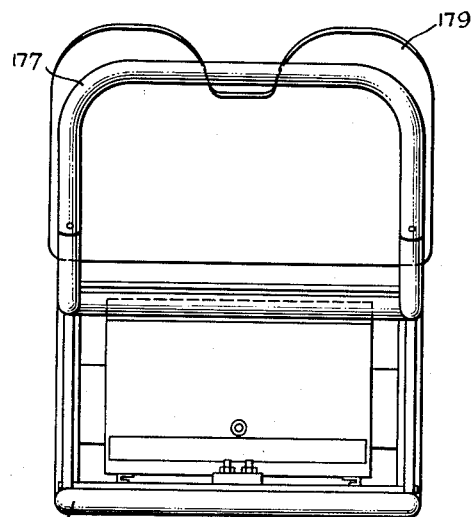
FIG. 18.
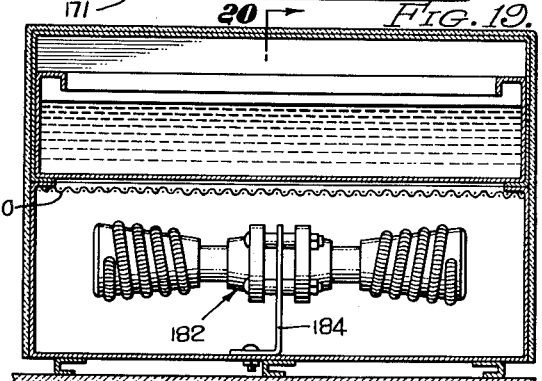
FIG. 19.
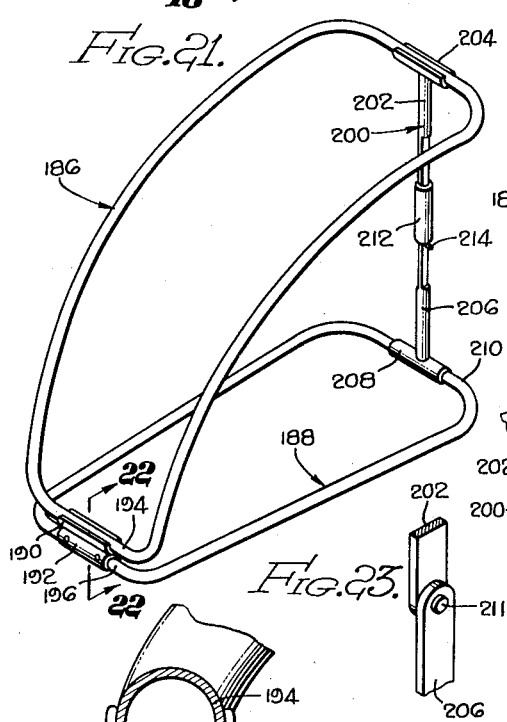
FIG. 21.
FIG. 23.
FIG. 22.
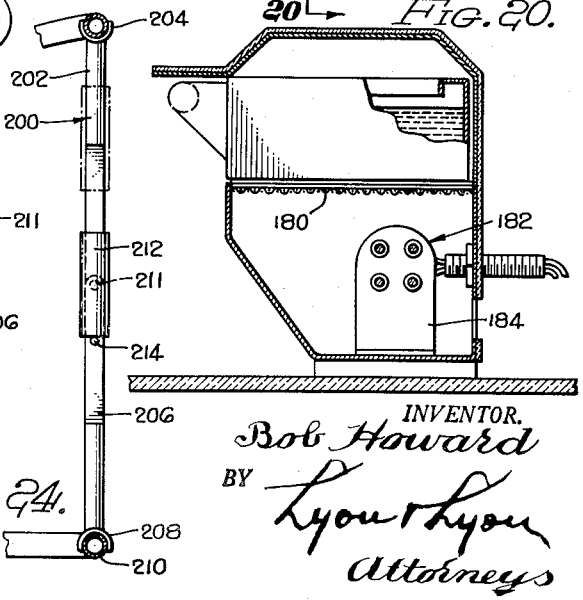
FIG. 20.
FIG. 24.
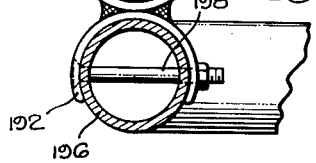
INVENTOR.
Bob Howard
BY Lyon & Lyon
Attorneys

United States Patent Office 2,725,577
Patented Dec. 6, 1955

2,725,577

HEALTH CABINET

Bob Howard, Los Angeles, Calif.

Application October 12, 1951, Serial No. 250,982

7 Claims. (Cl. 4—164)

This invention relates to health cabinets and particularly to health cabinets wherein warm moist air is circulated continuously throughout the cabinet.

It is an object of this invention to provide an enclosed cabinet wherein air is heated and humidified and continuously circulated through the cabinet.

It is a further object of this invention to provide a health cabinet wherein warm moist air is thermodynamically circulated continuously throughout the cabinet.

It is a further object of this invention to provide a health cabinet wherein warm moist air is circulated about an individual and is so directed to maintain a relatively constant temperature about the whole body of the user.

Still a further object of this invention is to provide a health cabinet which can be stored when not in use in a minimum of space.

It is a further object of this invention to provide a collapsible health cabinet which can be readily dismantled for storage when not in use.

Other objects and advantages of this invention will be readily apparent from the following description of the preferred embodiment of this invention.

The preferred embodiment of this invention generally contemplates a collapsible frame, a removable covering on said frame, a collapsible chair adapted to fit within said frame and a heating unit disposed beneath said chair.

Referring now to the drawings:

Figure 1 is a perspective view of a health cabinet embodying this invention.

Figure 2 is a sectional view of a portion of the heating chamber taken along the line 2—2 of Figure 9.

Figure 3 is a side elevation in section of the heating chamber taken along the line 3—3 of Figure 9.

Figure 4 is a sectional view taken along the line 4—4 of Figure 1.

Figure 5 is a rear elevation taken along the line 5—5 of Figure 4.

Figure 6 is a fragmentary view of the connection of the back rest to the frame of the chair.

Figure 7 is a fragmentary view of the pivotal connection at the forward part of the cabinet.

Figure 8 is a perspective view of the rear of the heating unit.

Figure 9 is a perspective view of the front of the heating unit.

Figure 10 is a sectional view taken along the line 10—10 of Figure 3.

Figure 11 is a perspective view of the frame of the cabinet in the upright position.

Figure 12 is a side elevation of the frame of the cabinet illustrating the collapsible feature of this invention.

Figure 13 is a sectional view taken along the line 13—13 of Figure 11.

Figure 14 is a perspective view of the under side of a modified form of this invention.

Figure 15 is a side elevation of a further modification of this invention.

Figure 16 is a sectional view taken along the line 16—16 of Figure 15.

Figure 17 is a side elevation of a modification of my chair and heating unit.

Figure 18 is a view taken along the line 18—18 of Figure 17.

Figure 19 is a side elevation partially in section of a modified form of the heating unit.

Figure 20 is a sectional view taken along the line 20—20 of Figure 19.

Figure 21 is a perspective view of a modified form of the collapsible frame.

Figure 22 is a sectional view taken along the line 22—22 of Figure 21.

Figure 23 is a fragmentary view of the elbow of the collapsible arm of Figure 21.

Figure 24 is an enlarged view of the collapsible arm of Figure 21.

The collapsible frame is preferably formed as hereinafter described. The upper frame member, generally designated 10, is preferably formed by parallel arcuate sides with cross bars 16 and 18 connecting the extremities of the arcuate sides. It is preferred to form the upper frame 10 of a continuous tubular element having rounded corners 20 to provide a stronger and more durable construction. A base generally designated 22 is formed at the sides 24 and 26 and a front 28 and rear 30. Similarly, it is preferred to construct the base of a continuous tubular element having rounded corners 32. The corners 20 on the upper frame 10 and corners 32 on the base 22 are preferably rounded to avoid sharp corners and possible source of injury. The front 28 of base 22 is pivotally connected to the cross bar 16 on upper frame 10 by a hinge 34, said hinge being of any suitable construction and may be bolted to the frames as seen in Figures 7 and 11. By providing this pivotal connection the upper frame 10 can be pivoted towards the base 22 as seen by the solid and phantom views illustrated in Figure 12. When the upper frame 10 is pivoted away from the bars 22 into the operative position as seen in Figure 11, it may be locked in the upright position by the supporting arms generally designated 36 and 38. In this embodiment the construction of each of the supporting arms is identical and only the details of construction of arm 38 will hereinafter be described.

The supporting arm 38 has a lower section 40 and an upper section 42 which are pivotally connected forming an elbow joint by pin 44, which in this embodiment projects through apertures in the extremity of the section 42 which is slotted to receive a flange 46 on the upper extremity of the section 40. The flange 46 has an aperture corresponding to the apertures in the extremity of the section 42 through which pin 44 projects to pivotally connect sections 40 and 42. Section 42 is pivotally connected by pin 48 to bracket 50, which in turn is suitably attached to upper frame member 10, herein accomplished by bolts as seen in Figure 4. Similarly, lower section 40 of supporting arm 38 is pivotally connected by pin 52 to bracket 54 which is suitably mounted to base frame 22.

It is of course a matter of choice where the pivotal connections between the supporting arm 38 and the upper frame 10 and base 22 are located, and the supporting arms 36 and 38 may be constructed of any desirable length. Sleeves 56 and 58 are slidably mounted on the supporting arms 36 and 38 to lock the supporting arms in the operative position and thereby retain the upper frame 10 away from the base 22. Suitable rivets 60 and 62 may be provided upon the supporting arms 36 and 38 to limit the downward movement of the sleeves 56 and 58. Thus when it is desired to collapse the frame, the sleeves 56 and 58 are pulled upward toward the upper frame 10, permitting the upper frame to be pivoted towards the base 22. When the sleeves are permitted to slide down upon supporting arms 36 and 38 until they strike the rivets 60 and 62, the sleeves will prevent pivotal motion between the upper and lower sections of the supporting arms.

Referring now to Figures 15 and 16, wherein a modified form of the collapsible frame is illustrated, and wherein like parts having the same function are given the same numerical designation. In this embodiment the arcuate sides 12 and 14 are provided with a slot on the under side thereof extending from the extremity adjacent the pivotal connection between base frame 22 and upper frame 10 to a point approximately half way between this pivotal connection and the other extremity of said arcuate sides. A supporting arm 168 is pivotally connected to each side 26 of base frame 22. Only one of such arms is illustrated and will be described, it being understood that a duplicate arm is similarly attached to the other side of base frame 22. This pivotal connection may be of any desirable type, herein illustrated as a pin 170 projecting through a suitable aperture in the lower extremity of supporting arm 168, the pin being supported by bracket 172, which has arms which project on each side of the extremity of arm 168, and these arms have apertures through which pin 170 projects. Supporting arm 168 at its upper extremity has a flange 174 which is adapted to fit into the slot 176 in side 14. Thus the supporting arm 168 may be pivoted towards front 28 of base frame 22, permitting upper frame 10 to pivot toward base 22. When arm 168 is pivoted away from front 28 it pivots the rear of top frame 10 away from the rear of the base frame 22. At the upper extremity of slot 176, an offset groove 178 may be provided of sufficient size to receive flange 174 of arm 168. Thus when arm 168 is pivoted to the upper end of slot 176, the flange 174 will slide into groove 178, locking the frame in the upright position.

It is preferred that the cover, generally designated 64, be removable from the collapsible frame to facilitate storage of the device. Any suitable material may be used for forming the cover 64. In this embodiment the cover is formed in two pieces, a lower section 66 and a top 68. The lower section 66 is adapted to receive the base frame 22 and to curve about the base 22 and project upwardly about the sides and rear of the cabinet. At the upper edge of the lower section 66 the material is curled about the upper frame 10 and snaps 70 are provided to retain the lower section about the upper frame 10. The top 68 is provided with suitable snaps 72 adapted to secure it to the lower section 66 of the cover 64. Slide fastening means such as a zipper 74, are provided to open the top 68. The zipper 74 is preferably constructed so that it may be operated from either the inside or the outside of the cabinet. The top 68 is provided with a suitable aperture 76, through which the head of the occupant may project, and flaps 78 and 80 are provided to cover suitable apertures in the top 68 through which the arms of the occupant may pass.

A chair 82 of suitable size to be inserted into the cabinet may be of any desirable construction. In this embodiment the chair is illustrated as having a back rest 84 which is pivotally connected by pins 86 to the frame 88 of the chair so that the back rest 84 may be pivoted downwardly toward the seat 90 of the chair to facilitate storage. The chair is otherwise of conventional design.

The heating unit, generally designated 92, is retained in a housing 94 which is provided with air inlets 96 at the rear of the housing. A drawer 98 is supported by a pair of brackets 100 mounted one on each side wall inside the housing 94. The drawer in this embodiment slides into the housing from the front thereof. The opening 102 in the front wall of the housing extends above the upper surface of the drawer 98 when it is inserted into the housing, thus providing a discharge outlet over the top of the drawer so that air passing through the heating unit enters the openings 96, which are positioned below drawer 98 and the air outlet, and passes over the drawer 98 and out the opening above the drawer. The drawer is adapted to retain a supply of water 104 which is evaporated and carried off by the warm air passing over the upper surface of the water. The drawer 98 is provided with a suitable handle 106 to facilitate opening and closing of the drawer. Baffles 108 and 110 may be mounted on the drawer or otherwise positioned in the discharge outlet. These baffles are preferably so positioned to deflect the air leaving the heating compartment outwardly toward the sides of the cabinet upon discharge from the heating unit 92. In this embodiment, the baffles 108 and 110 are constructed of a single piece of suitable material with the central portion 112 lying in the same vertical plane as the front edge of drawer 98 so that it seals off the central portion of the discharge opening and deflects the warm moist air leaving the heating unit onto the baffles 108 and 110 whereby it is deflected toward the side walls of the cabinet.

An upper baffle plate 114 may be suitably mounted on the upper part of the heating unit and project horizontally to the front of heating unit 92 preventing the warm moist air from passing directly upwardly upon leaving the heating unit, functioning to direct the air horizontally from the heating unit to the forward part of the cabinet.

The heating element may be of any suitable construction and in the embodiment shown in Figure 3 takes the form of coils 116 and 118 wrapped about the hollow ceramic tube 120 which is suitably mounted in and projects across the heating unit below the drawer 98 when said drawer is inserted into housing 94. In this embodiment the tube 120 is provided with grooves 156 at each end thereof which are adapted to fit within a suitable cut-away portion in spring members 158, which in turn are suitably mounted on the sides of the housing 94. The housing 94 is provided at each side with an aperture 160 through which the extremities of the tube 120 may project. These apertures 160 are preferably of sufficient size to permit the tube 160 to be vertically raised off spring member 158 to permit its removal. It is preferred to removably mount plates 162 on each extremity of the tube 120, these plates being constructed of asbestos, or other suitable heat resistant material, and adapted to close off the apertures 160 to prevent hot air escaping through these apertures. The coil 116, at one extremity, is connected through wire 122 to conductor 124, which is retained by a suitable insulator 126 to the housing 94. At the opposite extremity of the coil 116, wire 128 connects it to the conductor 130, which is also suitably mounted to the housing by insulator 132. The coil 118 is similarly connected at one extremity by wire 134 to the conductor 130 and at the opposite extremity by wire 136 through conductor 138 which is retained by insulator 140 to the housing 94. The conductors 124, 130 and 138 are suitably connected to a source of electricity and switch 142 is suitably inserted in the circuit, as well known to those skilled in the art, so that the circuit through conductor 124, coil 116 and conductor 130 may be energized; or at a different positioning of the switch, the circuit through conductor 138, coil 118 and conductor 130 may be energized; or at a different positioning of switch 142, the circuit through conductor 126, coil 116, coil 118 and conductor 138 may be energized. It is thus apparent that by varying the resistance in the coils 116 and 118, three heating temperatures may be attained in the heating unit.

When one or more of the circuits above described are energized, the heat generated by the coils heats the air in the housing 94 which causes it to rise and pass over the water 104 in drawer 98. The warm air then is deflected toward the side walls of the cabinet by baffles 108 and 110 and deflected horizontally toward the front of the cabinet by baffle 114. As the warm air passes out this discharge, air is drawn into the heating unit through air inlets 96. It is preferred to construct the heating unit so that the air inlets 96 are considerably larger than the air outlets formed between the upper surface of the drawer 98 and the top of the heating unit. This accelerates the air upon discharge from the heating unit creating a venturi effect, drawing air through air inlets into the heating unit. A ratio of about 10 to 1 in size of air inlet to air outlet has been found to insure a continuous circulation of air. At the bottom of the housing 94 it is desirable to insert a pad 144 of asbestos, or other suitable heat resistant material, to prevent loss of heat through the base of the housing 94. The heating unit may be mounted in any suitable manner in the cabinet. In this embodiment, the heating unit is mounted upon a base plate 146 which is bolted to rungs 148 and 150, which in turn are suitably mounted between the opposed legs of the chair 82. Above the base plate it is desirable to insert a plate 152 of asbestos, or other heat resistant material, to further prevent dissipation of heat from the heating unit 94 to the floor or other surface upon which the cabinet is situated.

A plurality of support members 154 space the housing 94 of the heating unit from the plate 152 to insulate the heating unit 92 from plate 152. Covering 164 of asbestos, or other suitable heat resistant material, may be suitably attached to the upper surface of the housing 94 to retain heat within the heating unit and prevent its dissipation through the upper surface of the housing 94.

Referring now to Figure 14, wherein a modified form of this invention is illustrated, and wherein like parts having the same function are given the same designation with the addition of the exponent a, it is apparent that the only difference between this modification and the principal embodiment lies in the provision of an aperture 166 in that portion of the cover 66a which covers the base 22 of the frame. By provision of this aperture 166 the device is adaptable for use by paraplegics, the cabinet being adapted to be placed over the head of the paraplegic and in all other respects functioning as does the principal embodiment.

The operation of this device is as follows:

Assuming that the health cabinet is dismantled and stored, the frame is first formed by pivoting the upper frame 10 away from its frame 22 and locking the supporting arms 36 and 38 in the upright position by sleeves 56 and 58. The frame is then inserted into the cover 64 which surrounds the frame forming the cabinet. The upper edges of section 66 are wrapped around the arcuate sides 12 and 14 and cross bar 18 and snapped to retain the section 66 in the proper position. The collapsible chair 82 is then inserted into the cabinet, carrying with it the heating unit 94 which may be mounted on the chair as described in this embodiment. When the chair is properly positioned within the cabinet, the top 68 is positioned over the top frame 10 and snapped onto the lower section 66 of the cover 64. The user then positions himself on the chair and the zipper 74 is pulled upwardly, thereby enclosing the whole cabinet with the occupant's head projecting through aperture 76. The switch 142 is then adjusted to the desired position, energizing the heating coils 116 and/or 118. The heat from the coils causes the warm air to rise in the housing 94 and to pass over the water filled drawer 98 and out the front of the housing 94, the warm air being deflected toward the sides of the cabinet by baffles 108 and 110 and deflected forwardly by the upper baffle plate 114. As the warm air passes from the heating unit, additional air is drawn through air inlets 96 into the housing 94. By providing the air outlets from the housing 94 of a smaller size than the air inlets 96, a continuous circulation of air may be maintained through the heating unit without the use of a blower or other artificial circulating means. The warm moist air is deflected to the forward part of the cabinet and rises along the arcuate top of the cabinet over the front of the occupant and down the passage formed between the back rest 84 of the chair and the rear wall of the cabinet and returning to the air inlets 96 where it is recirculated.

Referring to Figures 17–20, wherein modified forms of the chair and the heating unit are illustrated, in these modified forms the chair is provided with two sections; i. e., the bottom support stand 171. This is of a single tubular member forming a substantially rectangular base for the chair and in which both arms of the base project upwardly and rearwardly to form a support for the seat 173. To the rear of the seat 173 each arm of the tubular member is bent upwardly. The tubular member is hollow and telescopically receives the studs 175 formed on each extremity of the back rest support member 177, to which support member the back rest 179 is suitably attached.

The modified forms of heating units illustrated in Figures 17–20 are essentially the same as that of the principal modification with the exception that a screen 180 is inserted below the drawer 98 to insure uniform distribution of heat throughout the heating unit and to prevent possible contact with the heating coil upon removal or insertion of the drawer. Also, a unitary heating coil 182 is provided mounted upon a single bracket 184. This construction permits easy removal of the heating coil in the event of repair or replacement thereof and also simplifies the mounting of such coil.

Referring to Figures 21–24, the modified form of the collapsible frame is illustrated wherein the upper frame 186 is formed in the same manner as the upper frame 10 of the principal embodiment. Similarly, the base 188 is formed in the same manner as the base 22 in the principal embodiment.

The means for pivotally connecting the front extremities of the upper frame and the base is somewhat altered. In this embodiment two half pipes 190 and 192 are welded or otherwise suitably attached to one another so that their open faces are opposed to one another. These half pipes preferably are made of a resilient material and formed so that the distance between the opposed edges of each of said half pipe sections is smaller than the diameter of the cross arms 194 and 196. Thus, when the cross bar 194 is inserted into the half pipe 190 it is removably clamped therein. Similarly, the half pipe 192 fits about the cross bar 196, thus clamping the upper frame 186 and the base 188 together. A suitable bolt, such as 198, may be inserted through the half pipe 192 and the cross bar 196 to permanently secure these two members together. Thus, when it is desired to disassemble the frame, an upward force is exerted upon the cross bar 194 sufficiently to pull it out of the resilient half pipe 190.

Provided at the opposite extremity of the frame is a collapsible arm generally designated 200. This arm is provided with an upper section 202 which has at its upper extremity a half pipe 204 which is adapted to receive the cross bar 206 in the same manner that the cross bar 194 is retained in the half pipe 190. A corresponding section 206 is provided at the opposite extremity of the arm 200, having a half pipe 208 adapted to receive and retain the cross bar 210 of the base 188. The sections 206 and 202 are pivotally connected to one another by means of the pin 211. A sleeve 212 is provided upon the arm 200, which is free to slide upwardly along the arm 200 when the sleeve 212 is positioned adjacent the elbow formed by the pin 211 when the arm is held rigid.

A stud 214 may be provided upon the lower section 206 to restrain downward movement of the sleeve 212. Thus, when it is desired to collapse the frame the sleeve 212 is slid upwardly and the sections 202 and 206 are pivoted inwardly, permitting the upper frame 186 to pivot downwardly towards the lower frame 188. Each of the frame members may be withdrawn from the half pipe supporting each extremity thereof.

While the embodiment described contemplates a health cabinet wherein natural circulation of warm air is utilized, it is apparent that a fan or blower may be utilized to increase the circulation.

While the above description is of the preferred embodiment of this invention, it is not intended to limit the invention to the details described, but to the full scope of the appended claims.

I claim:

1. A health cabinet comprising: a flat base frame member, a curved frame member pivotally connected at one extremity to an extremity of said flat base frame member, said curved frame member being of greater length than said flat base frame member so that the unattached extremities of said members lie in a substantially vertical plane when said members are angularly spaced about said pivotal connection to form an acute angle, supporting means for selectively retaining said frame members in said spaced angular relation, a flexible cover adapted to enclose said frame members when in said spaced angular relation to form an enclosed cabinet, said cover having a front portion extending from the pivotally-connected extremities of said frame members along said curved frame member to the other extremity thereof with said curved frame member forming a continuous support for said front portion of said flexible cover, a seat adapted to be inserted into said cabinet and positioned in close proximity to the free extremity of one of said frame members, and means positioned beneath said seat for heating, humidifying, and circulating air throughout said cabinet.

2. A health cabinet as defined in claim 1 in which said supporting means comprise at least one supporting arm having sections pivotally connected to one another, and wherein one of said sections is pivotally connected to each of said frame members.

3. A health cabinet as defined in claim 1 in which said supporting means comprise: means forming guide slots in one of said frame members, supporting arms pivotally connected to the other of said frame members, flanges on said supporting arms adapted to fit into said guide slots so that pivoting of said supporting arms pivots the unattached extremities of said frame members apart.

4. A health cabinet as defined in claim 1 in which said flexible cover is provided with an aperture in the base permitting said enclosed cabinet to be placed over said seat and said heating, humidifying, and air-circulating means.

5. A health cabinet as defined in claim 1 in which each of said frame members are of endless tubular construction and have a generally rectangular configuration.

6. A health cabinet as defined in claim 1 in which said means for heating, humidifying, and circulating air throughout said cabinet are so arranged that circulation of said warm moist air is directed from beneath said seat toward the pivotal connection of said frame members then upwardly over the front of said seat and downwardly to the rear of said seat.

7. A health cabinet as defined in claim 6 in which said means for heating, humidifying, and circulating air throughout said cabinet comprise: a heating unit housing having a water pan therein and adapted to be inserted into said cabinet beneath said seat, means for heating air in said housing, an air inlet to said heating means, and an air outlet from said housing of smaller area than said air inlet, said air outlet being directed from beneath said seat toward the front portion of said cabinet and said air inlet being positioned to draw air in from behind said seat.

References Cited in the file of this patent

UNITED STATES PATENTS

| 643,822 | Isham | Feb. 20, 1900 |
| 1,464,093 | Friedlander | Aug. 7, 1923 |
| 2,303,465 | Howard | Feb. 1, 1942 |
| 2,551,552 | Wahl | May 1, 1951 |

FOREIGN PATENTS

| 3,509 | Great Britain | 1890 |